United States Patent [19]

Connolly

[11] Patent Number: 4,512,880
[45] Date of Patent: Apr. 23, 1985

[54] METHOD OF REMOVING SLIMES FROM SLURRIES

[76] Inventor: James D. Connolly, P.O. Box 1238, Princeton, W. Va. 24740

[21] Appl. No.: 489,491

[22] Filed: Apr. 28, 1983

[51] Int. Cl.$^3$ .......................... B07B 1/04; B01D 35/22
[52] U.S. Cl. ..................................... 209/250; 209/273; 209/281; 210/409; 210/420; 210/456
[58] Field of Search .............. 209/262, 264, 261, 282, 209/283, 273, 281, 250, 243, 240, 268, 380, 379; 210/433, 420, 421, 405, 409, 407, 456

[56] References Cited

U.S. PATENT DOCUMENTS

| | | | |
|---|---|---|---|
| 3,058,591 | 10/1962 | Nakahara | 209/250 |
| 3,231,087 | 1/1966 | Cusi | 209/250 |
| 3,247,965 | 4/1966 | Braun et al. | 209/240 |
| 3,306,671 | 2/1967 | Leeman | 209/243 |
| 3,640,383 | 2/1972 | Wantling | 209/273 |
| 4,113,626 | 9/1978 | Detcher | 209/281 |
| 4,233,159 | 11/1980 | Senda et al. | 209/273 |
| 4,422,937 | 12/1983 | Connolly | 209/281 |

Primary Examiner—Frank W. Lutter
Assistant Examiner—Wm. Bond
Attorney, Agent, or Firm—Wilmer Mechlin

[57] ABSTRACT

Method of removing slimes from slime-containing slurries in which the slurry is force fed at an acute angle onto a downwardly directed screen surface of a welded profile wire screen having fine screen openings at a pressure which for the slime content and impact angle of the slurry on the screening surface will project water and suspended slimes from the slurry through and beyond the screen a distance sufficient to cause gravity discharge of the slime suspension free of contact with the back of the screen below the impact area.

3 Claims, 3 Drawing Figures

METHOD OF REMOVING SLIMES FROM SLURRIES

BACKGROUND OF THE INVENTION

Welded profile wire screens having downwardly sloping or directed screen surfaces formed by laterally spaced transverse wedge-shaped profile wires or rods, are widely used as static screens in classifying and/or deliquefying liquid-solid mixtures fed as slurries to the screen surface for flow by gravity downwardly therealong transversely of or across the screen wires. Such screens depend for classification or size separation on the size of the slots or openings between the screen wires and the velocity of the slurry and separate liquid and undersized particles by a slicing or shearing action exerted by the screen wires on the underside or bottom of the slurry. For removing coarse solids of a size down to about 65 mesh, a sufficient velocity of flow of the slurry is obtained by a gravity feed of the slurry onto the screening surface from an overlying feed box. However, for separating fine fibrous or other non-abrasive solids of a size less than about 100 or 120 mesh with the screen openings ranging in width from about 150 down to about 50 microns, the necessary higher velocity requires the slurry to be pressure fed to the screen surface, as through a plurality of laterally spaced nozzles. Whether gravity or pressure fed, a static profile wire screen may be flat but more usually is a so-called "sieve bend" having a concave screen surface and in either case the slurry is fed or directed onto the screen surface at a tangent or parallel thereto.

Although a pressure fed fine opening profile wire screen is capable of fine separations, a problem is confronted when the solids in the slurry are in part slimes which have a pronounced affinity for and will adhere to almost any surface they contact. In general metallurgical practice, slimes, as distinguished from sands, are considered as any material finer than 200 mesh. However, the slimes encountered as solid suspensions in liquid carriers in solid-liquid mixtures, such as sewage, trade wastes and coal slurry, the last clay slimes derived from clays contained as a nonvolitile contaminant in the coal, usually are about 4 to 5 microns or less in particle size and thus sufficiently fine to enter the 50 micron slots of the finest of pressure fed screens now in general use.

The problem posed by the slime content of a slurry in a fine separation by a pressure fed screen is that the purpose of the pressure feed is to increase the velocity of flow of the slurry along the screen for enhancing the shearing action of the wedge-shaped screen wires and, with the feed tangential or parallel to the screening surface, there is no force for driving the separated liquid and undersized solids through the screen openings except along the leading sides of the screen wires. Consequently, in fine screening as presently practiced on profile wire screens, the removed liquid and suspended solids flow mainly by gravity downwardly along the leading sides of the screen wires and then along the backs of the wires forming the back of the screen. Any contained slimes thus are afforded an opportunity to adhere to the sides and backs of the screen wires and progressively blind or seal off the screen openings or slots from both front and back. It is to a solution of this problem that the present invention is particularly directed.

SUMMARY

The primary object of the present invention is to provide an improved method of removing slimes from slime-containing slurries or solid-liquid mixtures using a static profile wire screen having a downwardly sloping or inclined screen surface formed by laterally spaced profile screen wires, wherein the mixture in the form of low solids content, slime-suspending slurry is directed to impact the screen surface at an acute angle and a pressure which at the angle of impact and slime content of the slurry will project liquid and suspended slimes through openings in and beyond the back of the screen a distance sufficient to effect gravity discharge of the slime suspension out of contact with the back of the screen below the impact area.

Another object of the invention is to provide a method according to the preceding object wherein the mixture is a crushed coal slurry, the slimes are derived from clay contained in the coal, the coal after crushing is mixed with water into a slurry having a solids content in a range of about 5 to 15%, the angle of impact of the slurry on the screen surface is on the order of 10°–15°, and the pressure at which the slurry is fed to the screen surface is about 20–30 psi.

A further object of the invention is to provide a method according to the primary object, wherein the pressure for projecting removed liquid and suspended slimes through and beyond the back of the screen varies directly with the proportion of slimes in the solids content of the slurry and is sufficient to project the liquid and slimes at least two inches beyond the back of the screen.

The foregoing and other objects and advantages of the invention will appear hereinafter in the detailed description, be particularly pointed out in the appended claims, and be illustrated in the accompanying drawings, in which:

FIGURE DESCRIPTION

DETAILED DESCRIPTION

Figure 1:
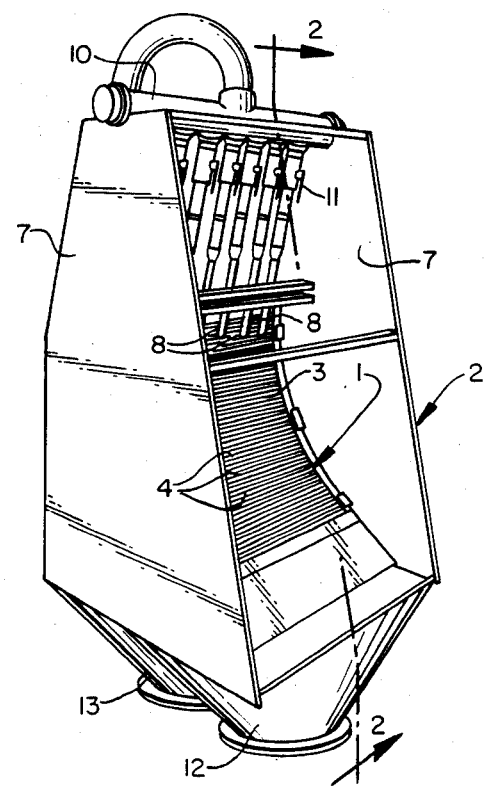
FIG. 1 is a perspective view of screening apparatus suitable for practicing the method of the present invention.
Figure 2:
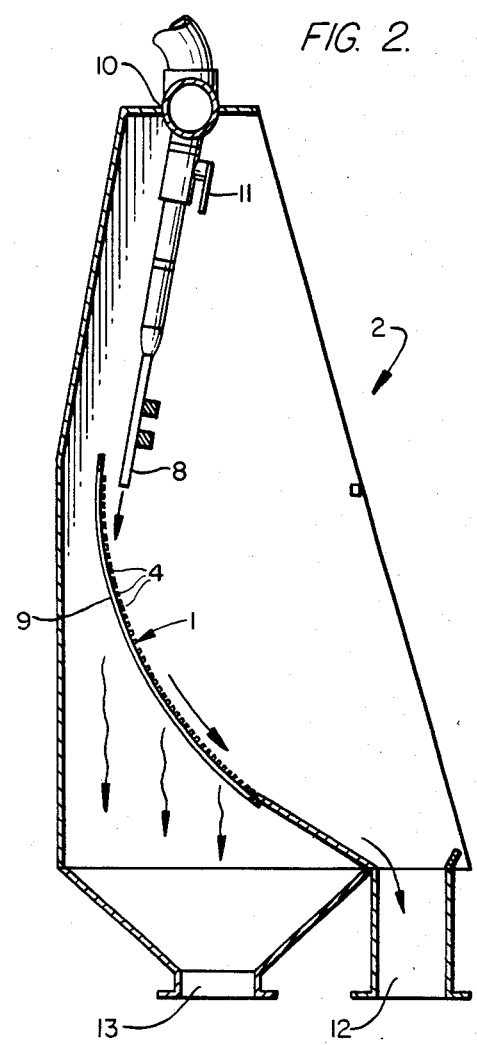
FIG. 2 is a vertical sectional view taken along lines 2—2 of FIG. 1.
Figure 3:
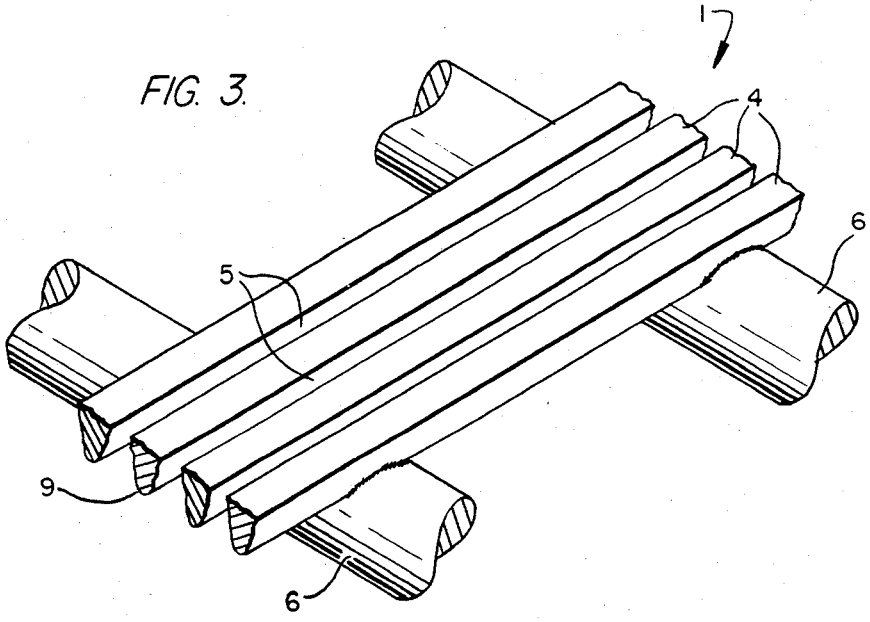
FIG. 3 is a fragmentary perspective view on an enlarged scale of a part of the screen of the apparatus of FIG. 1.

The improved method of the present invention of removing slimes from slime-containing slurries or other liquid-solid mixtures, is particularly adapted to be practiced or used on or with a pressure fed welded screen of the type known as a "profile" wire or rod screen for having a screen surface formed by laterally spaced, wedge-shaped or triangular profile screen wires or rods.

As shown in the accompanying drawings, the screen preferred for use in practicing the improved method is a static profile wire screen 1 suitably forming a removably mounted part of screening apparatus 2 and having a screen or flow surface or deck 3 formed by suitably parallel transverse wedge-shaped profile wires, rods, or bars 4 laterally spaced by transverse screen slots or openings 5 and attached as by welding, to and backed and connected by laterally spaced suitably parallel longitudinal tie rods or bars 6. Whether flat, or as illustrated, concave, the screen surface 3 is downwardly directed at an incline or slope at which, with an assist from centrifugal force if concave, the screen surface will maintain contact with a slurry flowing by gravity longitudinally therealong across or transversely of the transverse screen wires and usually will be mounted in the apparatus 2 between side boards 7 for laterally containing the slurry.

For pressure feeding a slurry or liquid-solid mixture to the screen or flow surface 3, the illustrated apparatus 2 has a bank or plurality of nozzles 8 directed or disposed longitudinally of the screen in or parallel to the flow direction of slurry along the screen surface 3 and of a number and lateral spacing to apply the slurry substantially across or over the full width of the screen. The nozzles 8 are tilted downwardly or inwardly relative to the screen surface 3, all suitably at the same acute angle, so that the jets of slurry issuing therefrom will impact or contact with the screening surface at an acute angle relative thereto. Consequent upon the impact angle of the slurry relative to the screen surface 3, the force impacting the slurry as jets on the screen has a component vertical or normal to the screen surface for positively driving or projecting liquid and suspended undersized particles including slimes, through and beyond the screen for free fall by gravity out of contact with the screen's back 9. The slurry conveniently is fed under pressure to the nozzles 8 through a manifold or header 10 and flow of the slurry through the nozzles may be controlled or regulated either by common valving in advance of the manifold or, as illustrated, by an individual valve 11 for each nozzle. As befits its intended operation, the screening apparatus 2 has separate outlets, one, 12, for discharging undersized particles and liquid passing through the screen 1 and the other, 13, for discharging oversized particles and any other residue flowing off the screen surface 3.

Exemplary of practice of the method of the present invention in removing slimes from slime-containing slurries or other liquid-solid mixtures, suitably using the above described screening apparatus 2, is its application in a coal processing plant. On delivery to a plant from a mine, coal, before it is washed, is crushed and classified for further processing into several size ranges. It is to the smallest of these ranges, usually 28 to 0 mesh, that the presence of slimes is particularly detrimental to further processing. In general, then, the starting material in removing slimes from coal will be crushed coal of 28 to 0 mesh, with 150 mesh ordinarily the practical minimum size of the recovered coal. In accordance with the present method, this crushed coal is mixed with water into a slurry of a low solids content or consistency suitably of the order of 5–15%.

The particle size of slimes derived from clay contained in the coal usually being 4–5 microns or less, the profile wire screen 2 used in the present method, as applied to coal for removing slimes while recovering coal particles of 150 mesh or larger, suitably will have slot openings up to a maximum width on the order of about 100 microns. Using such a screen and with the nozzles 8 so tilted as to direct slurry against the screen surface 3 at an impact angle on the order of about 10 to 15 degrees and a pressure of about 20–30 p.s.i. (1.4–2.1 kg./sq. cm. will suffice to drive carrier liquid, here water, and suspended slimes through the screen openings or slots 5 in the area of impact and therebeyond for free fall to the liquid outlet 12 clear of or out of contact with the backs of the screen wires forming the back 9 of the screen. For either flat or concave surface screens, the projection of the slime suspension beyond the back of the screen should be at least two inches to ensure free fall of the suspension to the liquid outlet and, within the preferred ranges, the impact angle and pressure will vary directly with the percentage of slimes in the initial solids content of the slurry.

Whether applied to coal slurries or other liquid-solid mixtures, the basic essentials of the improved method are that the liquid carrier be present in sufficient quantity to ensure suspension of the slimes, that the slurry be impacted with the screen surface at an angle such as to provide a force component perpendicular to the screen surface 3 and that for a given impact angle and percentage of slimes, the penpendicular force component be of an order ample to drive liquid and suspended slimes from the slurry through and a sufficient distance, suitably at least two inches, beyond the back of the screen to ensure its free fall by gravity to the liquid outlet out of contact with the screen's back.

From the above detailed description it will be apparent that there has been provided an improved method of removing slimes from liquid-solid mixtures using a profile wire screen which effectively removes the slime without blinding or sealing off the screen from either front or back. It should be understood that the described and disclosed embodiment is merely exemplary of the invention and that all modifications are intended to be included that do not depart from the spirit of the invention and the scope of the appended claims.

Having now described my invention, I claim:

1. A method of removing slimes from a low solids content slime-containing liquid-solids mixture using without blinding a screen having a longitudinally dowhwardly sloping screen surface formed of laterally spaced transverse profile screen wires, comprising pressure feeding said mixture to said screen surface longitudinally of and at an acute impact angle relative to said surface at a pressure which, for the slime content and impact angle of the mixture, over the area of impact will drive liquid and contained slimes through and beyond a back of the screen for gravity discharge out of contact with said back.

2. A method according to claim 1, wherein the screen is a removably mounted part of a screening apparatus, including for pressure feeding the mixture to the screen surface, a plurality of substantially parallel nozzles directed longitudinally of and at a predetermined angle relative to the screen surface and of such number and so laterally spaced as to feed the mixture over substantially the full width of the screen surface.

3. A method according to claim 2, wherein the solids content of the liquid-solids mixture is on the order of about 5–15%, the impact angle of the mixture on the screen surface is about 10°–15°, and the pressure at which the mixture is fed to the screen surface is in a range of about 20–30 p.s.i.

* * * * *